United States Patent [19]

Nagaoka et al.

[11] Patent Number: 4,843,729
[45] Date of Patent: Jul. 4, 1989

[54] MOUNTING STRUCTURE FOR MAGNETIC LINEAR SCALE UNIT

[75] Inventors: Kazuo Nagaoka; Sadao Wakabayashi; Toshihiko Kanasugi; Tadao Hatano, all of Tokyo, Japan

[73] Assignee: Sony Magnescale, Inc., Tokyo, Japan

[21] Appl. No.: 86,537

[22] Filed: Aug. 18, 1987

[30] Foreign Application Priority Data

Aug. 28, 1986 [JP] Japan .................................. 61-202112

[51] Int. Cl.$^4$ .......................... G01B 7/14; G01B 11/04
[52] U.S. Cl. ......................................... 33/708; 33/700; 33/702
[58] Field of Search ............. 33/125 T, 125 R, 125 C, 33/125 A

[56] References Cited

U.S. PATENT DOCUMENTS

| 3,975,100 | 8/1976 | Taylor | 356/106 |
| 4,198,757 | 4/1980 | Nelle et al. | 33/125 |
| 4,320,578 | 3/1982 | Ernst | 33/125 |
| 4,530,157 | 7/1985 | Nelle | 33/125 |
| 4,549,354 | 10/1985 | Affa et al. | 33/125 |
| 4,649,648 | 3/1987 | Nagaoka et al. | 33/125 T X |

FOREIGN PATENT DOCUMENTS 2941205 7/1981 Fed. Rep. of Germany .
3527652 6/1986 Fed. Rep. of Germany .

Primary Examiner—William A. Cuchlinski, Jr.
Assistant Examiner—Thomas B. Will
Attorney, Agent, or Firm—Ronald P. Kananen

[57] ABSTRACT

A magnetic linear scale unit comprises a magnetic scale and mounting blocks which are designed to be rigidly fixed to one of relatively displaceable mechanical components, about which magnitude or stroke of the relative thrusting displacement is to be measured. The magnetic scale has end sections to be mounted on the mounting blocks. The end sections have round peripheral portion mating with the mounting block. At least one of the end section also includes a structural component which allows pivotal movement of the magnetic scale relative to the mounting block for fine adjustment of the axis of the magnetic scale relative to the axis of relative movement of the mechanical components. A scale channel is free from the mounting block and simply serves as the magnetic shield. Therefore, the scale channel of the invention is substantially free from the accuracy requirement and production error of the scale channel and will never affect measurement of the displacement magnitude.

16 Claims, 8 Drawing Sheets

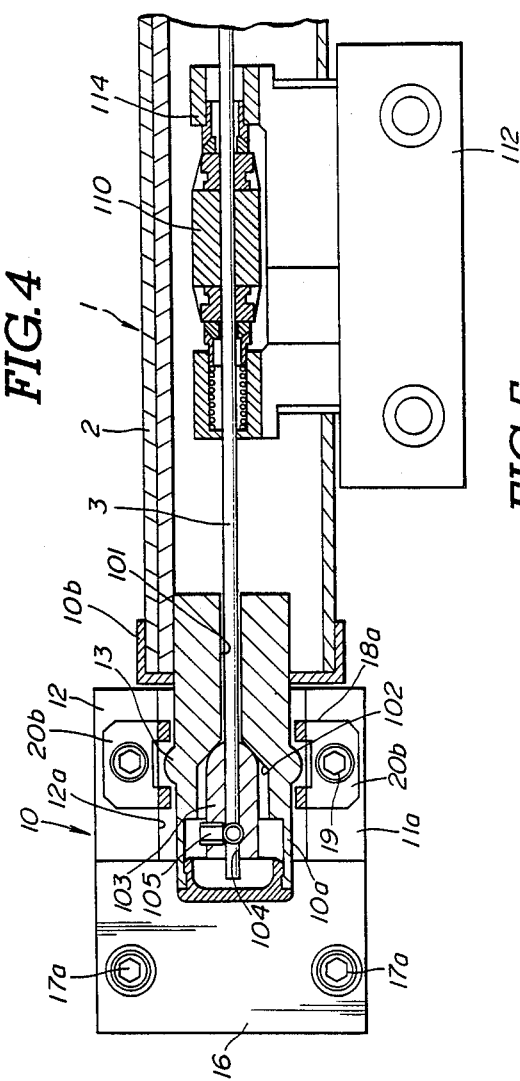
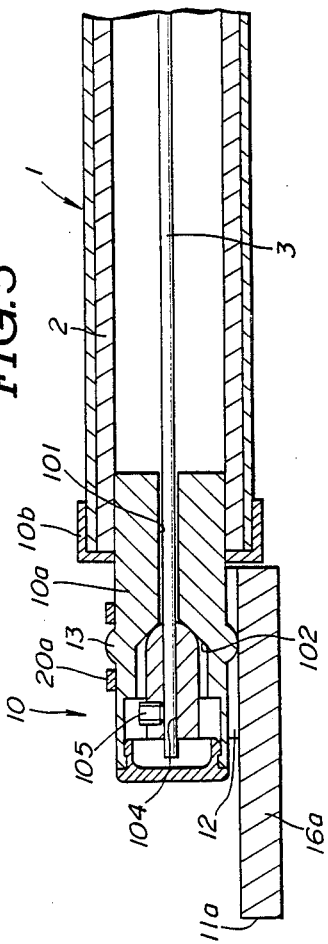
FIG. 4
FIG. 5

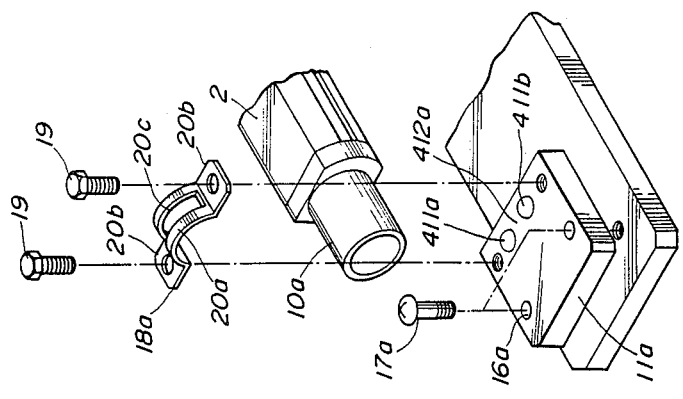
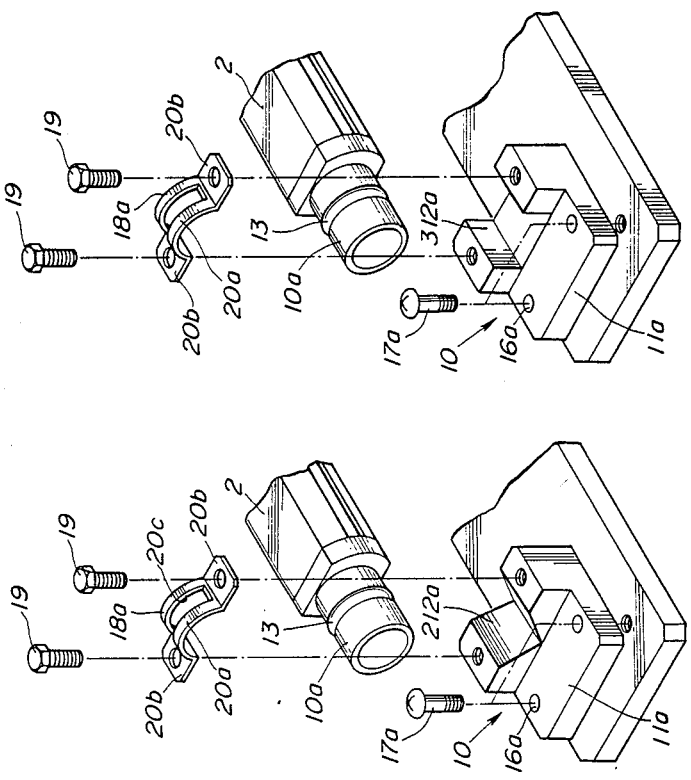

MOUNTING STRUCTURE FOR MAGNETIC LINEAR SCALE UNIT

BACKGROUND OF THE INVENTION

1. Field of the Invention

The present invention relates generally to a magnetic linear scale unit for precisely measuring a relative motion stroke between relatively displaceable two mechanical components. More specifically, the invention relates to a structure for conveniently and efficiently mounting the magnetic linear scale unit onto the relative displaceable components, which mounting structure allows precise adjustment of the magnetic scale position when the scale is installed between relatively displaceable components.

2. Description of the Background Art

As is well known, a magnetic linear scale unit is used for monitoring displacement of one mechanical component relative to the other mechanical component in precise manner. In general, such magnetic linear scale requires a substantially high accuracy in measurement of the stroke of displacement between two mechanical components in an order of micron or ten microns. This requires strict accuracy in mounting the magnetic linear scale unit between the mechanical components. Especially, in mounting of an elongated magnetic scale in a form of a rod or ribbon, for example, substantial precision is required so that the axis of the magnetic scale is arranged precisely parallel to the axis of movement of the mechanical components.

Conventionally, the magnetic scale is rigidly mounted in a scale channel which serves not only as a support for the magnetic scale but also as a magnetic shield. Both ends of the scale channel are so designed as to be rigidly fixed onto one of the relatively displaceable two mechanical components. This means that, since the magnetic scale is mounted rigidly in the scale channel, the accuracy of mount of the scale channel directly reflects on the mounting accuracy of the magnetic scale. On the other hand, the mounting surface, on which an assembly of the scale channel and the magnetic scale is to be mounted is not always precisely flat and accurately parallel to the axis of the movement of the mechanical component or components. When the mounting surface is not precisely parallel to the axis of the movement of the mechanical component or components, additional difficulty has arisen in assuring holding precise parallelism of the magnetic scale relative to the moving axis. It has been a usual technique to compensate the obliquity of the mounting surface to insert a kind of spacer between one end of the scale channel and the corresponding section of the mounting surface. This requires substantially high skill in mounting the assembly of the scale channel and the magnetic scale. Further to say, even for the skilled engineer, it is still a difficult job for mounting the scale assembly with satisfactorily high accuracy.

In order to solve this problem in the prior art, an improved mounting structure for the magnetic linear scale unit has been proposed in the U.S. Pat. No. 4,649,648, issued on Mar. 17, 1987, to Kazuo NAGAOKA et al, which has been assigned to the common assignee to the present invention. The invention disclosed in the aforementioned United States Patent was also disclosed in the German Patent First Publication (DE-OS) No. 35 30 776. The prior proposed invention, set forth above, is successful in providing satisfactory adjusting ability for the magnetic linear scale unit for providing accuracy of mounting of the magnetic scale precisely parallel to the moving axis of the movable member.

SUMMARY OF THE INVENTION

The present invention is to provide an improvement for the aforementioned prior invention to more accurately and more conveniently mount the magnetic scale between a stationary member and a movable member.

Therefore, it is an object of the present invention to provide a magnetic linear scale unit which does not require accuracy in a scale channel.

In order to accomplish the aforementioned and other objects, a magnetic linear scale unit, according to the present invention, comprises a magnetic scale and mounting blocks which are designed to be rigidly fixed to one of relatively displaceable mechanical components, about which magnitude or stroke of the relative thrusting displacement is to be measured. The magnetic scale has end sections to be mounted on the mounting blocks. The end sections have round peripheral portions mating with the mounting block. At least one of the end section also includes a structural component which allows pivotal movement of the magnetic scale relative to the mounting block for fine adjustment of the axis of the magnetic scale relative to the axis of relative movement of the mechanical components.

In the construction of the magnetic linear scale according to the invention, a scale channel is free from the mounting block and simply serves as the magnetic shield. Therefore, the scale channel of the invention is substantially free from the accuracy requirement and production error of the scale channel will never affect in measurement of the displacement magnitude.

According to one aspect of the invention, a mounting structure for a magnetic linear scale unit comprises a scale assembly including an elongated magnetic scale, and a shield member for establishing a magnetic shield around the magnetic scale, a end member extending from the end of the scale assembly, the end member having a round periphery at least in part, a mount secured to a mounting surface defining a round inner periphery groove for receiving the end member, the inner periphery of the groove being so designed as to mate with the round periphery of the end member, and a member interposed between mating peripheries of the end member and the mount for reducing contact area between the outer periphery of the end member and the inner periphery of the groove for allowing pivotal movement of the scale assembly relative to the mount.

The structure may further comprise a fastener releasably holding the end member in the groove.

In the preferred construction, the member for reducing the contact area may be so designed as to define a pivot for the scale assembly for pivotal movement about the mount. The member for reducing the contact area may also be so designed as to determine the axial position of the end member relative to the mount.

In practice, the member for reducing the contact area establishes a line-contact with a circumferentially extending line between the inner periphery of the groove and the outer periphery of the end member. On the other hand, it is also possible that the member for reducing the contact area establishes point-contacts with a contact point between the inner periphery of the groove and the outer periphery of the end member. In this case, the member for reducing the contact area establishes two contact points at positions laterally aligned and essentially symmetrical positions with respect to the center axis of the scale assembly. In the alternative, the member for reducing the contact area establishes three contact points which are so arranged as to define the position of the end member.

The member for reducing the contact area may also establish a line-contact with a circumferentially extending line between the inner periphery of the fastener and the outer periphery of the end member. The member for reducing the contact area may establish point-contacts with a contact point between the inner periphery of the fastener and the outer periphery of the end member.

The structure may also comprise a pair of the end members extending from both ends of the scale assembly and a pair of mounts oriented at positions corresponding to the end members for receiving the latter, one of the end members having the projection circumferentially extending on the outer periphery and being received in the groove of one of the mounts, which groove has smooth inner periphery, for establishing line contact which defines pivot for pivotal movement of the scale assembly thereabout, and the other end member having smooth outer periphery and received in the groove of the other of the mount, which groove has the projection for establishing line contact which defines pivot for pivotal movement of the scale assembly thereabout. The end members comprise a cylindrical members having round outer periphery.

On the other hand, the structure may comprise a pair of the end members extending from both ends of the scale assembly and a pair of mounts oriented at positions corresponding to the end members for receiving the latter, one of the mounts being formed with a groove having a bottom from which a plurality of projections extend, the projections being in contact with the outer periphery of the end member. The projections are so arranged as to define the orientation of the associated end member relative to the mount. The groove is formed with three projections arranged to establish three-points contact with the outer periphery of the end member for defining pivoting point of the scale assembly essentially at the center of the three-points.

In practice, the structure further comprises a fastener having a projection extending from the surface mating the outer periphery of the end member, and the groove is formed with a pair of projections arranged in lateral alignment with each other and essentially symmetrical positions with respect to the center axis of the scale assembly, the projection of the fastener being cooperative with the projections of the groove for establishing three-points contact with the end member for defining the pivot for the scale assembly.

According to another aspect of the invention, a magnetic linear scale for measuring displacement between first and second mechanical components, at least one of the first and second mechanical components being movable relative to the the other, comprises a magnetic scale mounted on the first mechanical component, the magnetic scale having an axis along which relative displacement between the first and second mechanical components is measured, a magnetic head thrustingly engaged to the magnetic scale for causing relative thrusting movement with respect to the magnetic scale at a magnitude corresponding to the relative displacement between the first and second mechanical components, a member secured onto the second mechanical component and physically connected to the magnetic head for causing relative displacement between the the magnetic head and the magnetic scale according to relative displacement between the first and second mechanical components, a pair of mounts to be secured onto the first mechanical component for receiving ends of the magnetic scale, means for limiting contact area between the periphery of the magnetic scale and each of the mounts in such a manner that the limited contact area defines a pivot allowing pivotal movement of the scale rod thereabout and determining axial position of the associated end of the magnetic scale relative to the mount, and fasteners secured to the mounts for retaining the ends of the magnetic scale on the mounts, the fastener means being securable in a first position where the magnetic scale is pivotally movable about the pivot for adjustment of the scale axis to be precisely parallel to an axis along which relative displacement between the first and second mechanical components occurs, and a second position restricting axial and pivotal movement of the magnetic scale relative to the mount.

BRIEF DESCRIPTION OF THE DRAWINGS

The present invention will be understood more fully from the detailed description given herebelow and from the accompanying drawings of the preferred embodiments of the present invention, which, however, should not be taken to limit the invention to the specific embodiments, but are for explanation and understanding only.

In the drawings:

FIG. 4 is an enlarged partial section of the magnetic linear scale of FIG. 1, taken along line IV—IV of FIG. 3;

FIG. 5 is an enlarged partial section of the magnetic linear scale of FIG. 1, as taken along line V—V in FIG. 2;

FIGS. 9 to 11 are exploded and enlarged perspective views of modifications of the preferred embodiment of the magnetic linear scale of FIG. 1;

DESCRIPTION OF THE PREFERRED EMBODIMENT

Figure 1:
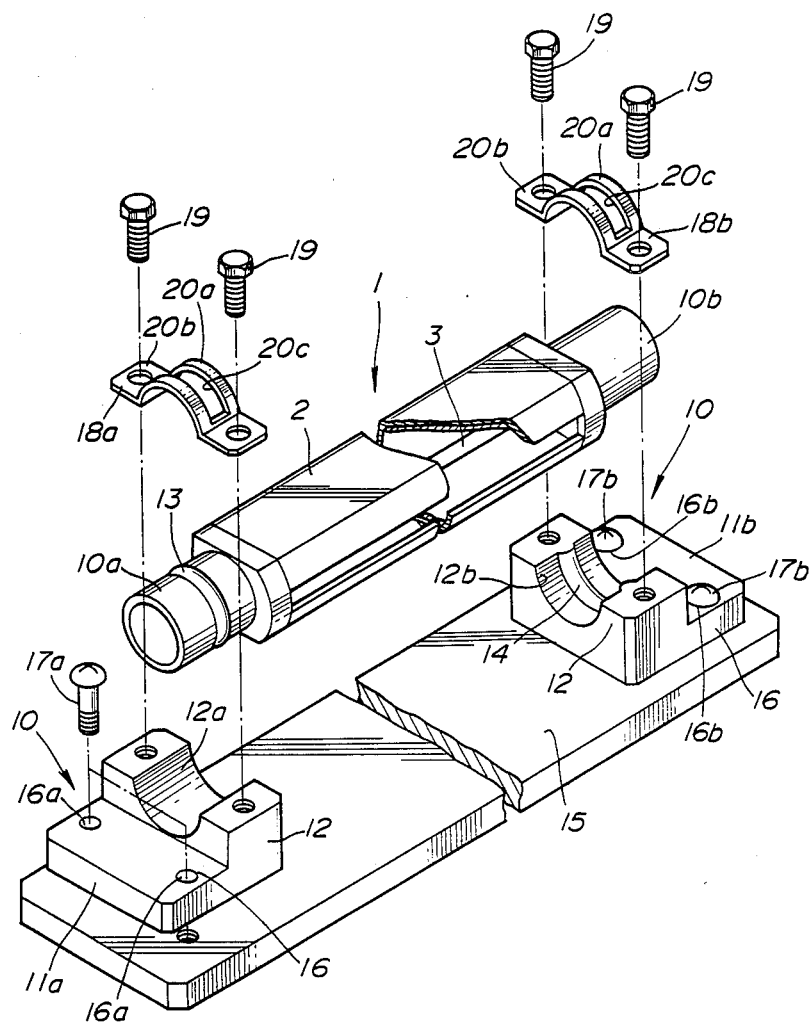
FIG. 1 is an exploded perspective view of the preferred embodiment of a magnetic linear scale unit according to the present invention.
Figure 2:
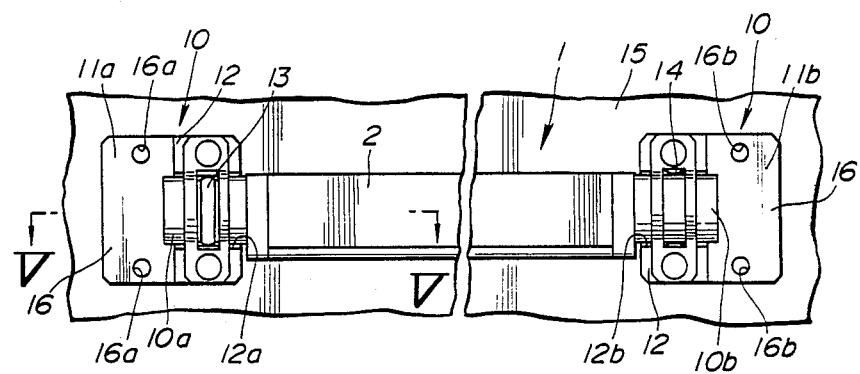
FIG. 2 is a plan view of the preferred embodiment of the magnetic linear scale unit of FIG. 1, in assembled form.
Figure 3:
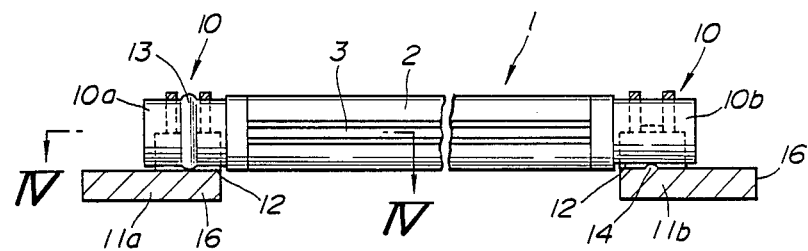
FIG. 3 is a side elevation of the preferred embodiment of the magnetic linear scale of FIG. 1 in the assembled form.

Referring now to the drawings, particularly to FIGS. 1 to 3, the preferred embodiment of a magnetic linear scale unit, according to the present invention, includes a magnetic scale assembly 1 and mounts 10 for mounting the magnetic scale assembly onto a mounting plane 15. In practice, the mounting plane 15 may be a substantially flat plane formed on one of the relatively displaceable mechanical components, about which the relative thrusting movement stroke is to be measured. Therefore, in case the linear scale is applied for machine tool, the mounting plane may be constituted by a flat section of the machine. The magnetic scale assembly 1 comprises a magnetic scale 3 in a form of a cylindrical rod, and a scale channel 2. The magnetic scale 3 employed in the shown embodiment will be hereafter referred to as "scale rod".

However, it should be noted that the invention is applicable for not only the scale rod type magnetic linear scale but also for any type of magnetic scales, such as a ribbon or strip type scale. Therefore, the scale rod constituting the preferred embodiment of the linear scale should be appreciated as mere example to illustrate the invention in detail.

The scale rod 3 is surrounded by the scale channel 2 which is in an essentially hollow cylindrical construction with a longitudinally extending slot 2a. A magnetic head 110 mounted on the scale rod 3 in thrustingly movable fashion is connected to the other of the mechanical components via a link and a slider 112. The structure for connecting between the magnetic head and the slider has been disclosed in the aforementioned U.S. Pat. No. 4,649,648 in detail. The detailed discussion given in the above-mentioned United States Patent, will be herein incorporated by reference for the sake of disclosure.

The scale rod 3 is connected to essentially cylindrical member 10a and 10b at both ends thereof. In the shown embodiment, one of the cylindrical member 10a has an annular projection 13 extending circumferentially along the outer periphery thereof. The annular projection 13 has a rounded top and is oriented at an essentially intermediate portion between the ends of the cylindrical member 10a. On the other hand, the other cylindrical member 10b connected to the other end of the scale rod 3 has smooth outer periphery without forming the annular projection. These cylindrical members 10a and 10b constitute part of the aforementioned mounts 10 for mounting the magnetic scale assembly 1 on the mounting surface 15.

The mounts 10 further comprise a pair of mounting blocks 11a and 11b. Each of mounting blocks 11a and 11b is of essentially L-shaped configuration in longitudinal section and has a section 12 and a section 16. The section 16 lies substantially parallel to the mounting surface 15 and adapted to be rigidly secured onto the mounting surface 15. In order to be rigidly secured onto the mounting surface 15, the sections 16 of the mounting blocks 11a and 11b are formed with through openings 16a and 16b to receive fastening screws 17a and 17b. On the other hand, the sections 12 extend perpendicular to the corresponding sections 16. The sections 12 are formed with a semicircular grooves 12a and 12b extending in axial direction. The groove 12a is designed for receiving the cylindrical member 10a and the groove 12b is designed for receiving the cylindrical member 10b. The groove 12a has a substantially smooth inner periphery to establish a line-contact with the round top annular projection of the cylindrical member 10a. On the other hand, an arc-shaped projection 14 is projected from the inner periphery of the groove 12b and extends in circumferential direction. Similarly to the projection 13, the projection has the round top. The round top projection 14 is adapted to contact with the smooth cylindrical periphery of the cylindrical member 10b to establish the line contact therebetween.

The mounts 10 also comprise fastening clips 18a and 18b. Each of the fastening clips 18a and 18b respectively have semicircular major section 20a and a pair of flange sections 20b. A groove 20c is formed in the major section 20a of each fastening clip 18a and 18b. The groove 20c of the clip 18a receives the projection 13 so that the whole surface of the major section 20a tightly contact with the outer periphery of the cylindrical member 10a for fixedly secure the cylindrical member on the mounting block. The flanges 20b of the clips 18a and 18b are formed with through openings. Fastening bolts 19 pass through the through openings to engage with threaded openings for fastening the clips 18a and 18b to rigidly secure the clips on the top of the sections 12 of the mounting blocks 11a and 11b.

It should be appreciated that though the shown embodiment utilizes the same construction of the fastening clips 18a and 18b, it is not necessary to form the groove for the clip 18b.

FIGS. 4 and 5 show detailed construction of the above-described preferred embodiment of the magnetic scale unit of the invention. The cylindrical members 10a and 10b and mounting structure thereof are essentially the same construction to each other. Therefore, the following discussion with reference to FIGS. 4 and 5, should be appreciated as that applicable for the cylindrical member 10b and the mounting structure thereof.

As seen from FIGS. 4 and 5, the cylindrical member 10a is formed with an axially extending opening 101. The opening 101 opens to a recess 102 formed at the end of the cylindrical member. The end of the scale rod 3 extends through the through opening 101 and engage with a rounded top fitting 103. The fitting 103 is formed with an axially extending opening 104 to receive the end of the scale rod 3. The rounded head of the fitting 103 contacts with the inner periphery of the recess 102. On the other hand, the fitting 103 is rigidly secured to the end portion of the scale rod 3 by means of a fastening key 105.

A flange member 106 is secured to the outer periphery of the cylindrical member 10a. The scale channel 2 rigidly engages with the flange member 106. By rigidly connecting the flange members 106 to both ends of the scale channel 2, a fixed distance between the cylindrical members 10a and 10b is provided. This assures appropriate tension for the scale rod 3.

The magnetic head 110 is supported by a head carrier 114 which is connected to the slider 112. The preferred construction of the head carrier has been illustrated in the German Patent First Publication (DE-OS) No. 36 08 392, which invention has been assigned to the common assignee to the present invention. The disclosure of the aforementioned German Patent First Publication is herein incorporated by reference for the sake of disclosure.

Figure 6:
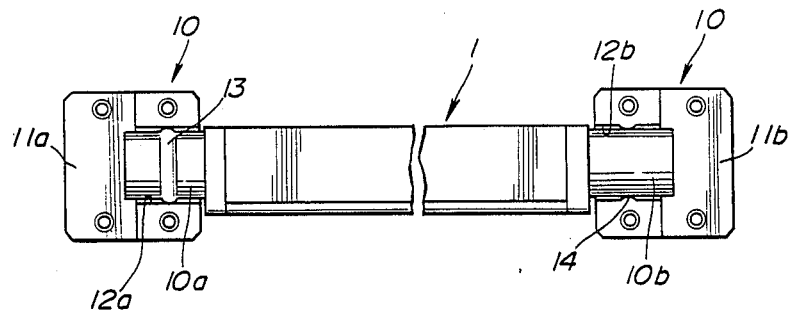
FIGS. 6 and 7 are plan view of the preferred embodiment of the magnetic linear scale of FIG. 1, which illustrate the scales mounted on an object.
Figure 7:
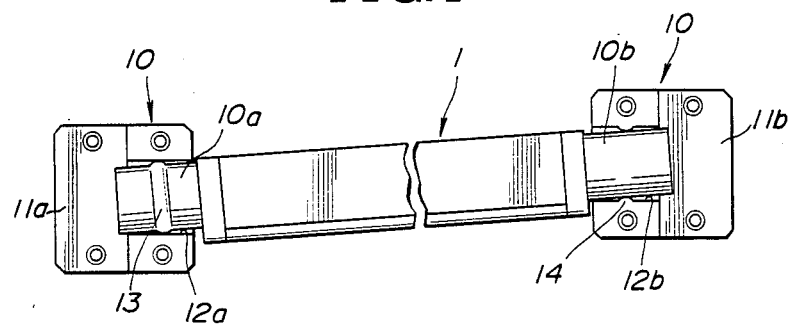

Upon mounting the preferred embodiment of the magnetic linear scale unit onto the mounting surface, the mounting block 10a is, at first, fixed onto the mounting surface by means of the fastening bolts 17a, at an appropriate position. The cylindrical member 10a is then placed on the groove 12a of the section 12 of the mounting block 10. The fastening clip 18a is secured onto the top of the section 12 of the mounting block 10. Then, the annular projection 13 is received in the groove 20c. At this time, since the groove 20c has wider width than the projection 13 only, the magnetic scale assembly 1 is shown in FIGS. 6 and 7.

As will be appreciated, by pivotally moving the magnetic scale assembly 1, the position of the scale rod 3, at which the parallelism of the scale rod to the moving axis of the movable member can be obtained, is easily determined. After determining the scale rod position, the mounting block 11b is secured onto the mounting surface with mounting the cylindrical member 10b on the groove 12b. The cylindrical member 10b is then fixed onto the mounting block 11b by means of the fastening clip 18b.

In this connection, it would be essential in the shown embodiment to provide the grooves for receiving the cylindrical members in such a manner that the cylindrical member can be pivotable about the groove for adjusting the orientation of the scale rod with respect to the axis of the movement of the movable member.

As set forth above, the preferred embodiment of the magnetic linear scale according to the present invention is advantageous since it can assure accurate positioning of the scale rod without requiring substantial positioning operation. Furthermore, according to the invention, since the scale channel is constructed to merely constitute the magnetic shield and not to support the scale rod, substantially high accuracy in production thereof is not required. Furthermore, it is not so difficult to provide sufficient and satisfactory accuracy in production and assembling of the scale rod, on the cylindrical member. This provides substantial uniformity of the assemblies of the scale rod and the cylindrical members. Therefore, in order to replace the scale rod, the fastening clips are simply released to release the scale rod from the mounting block and replacement assembly is set on the mounting block. This means it is not necessary to perform position adjustment of the scale rod after positioning of the scale rod is made.

In addition, as will be seen from FIGS. 4 and 5, the fitting fitted to the end portion of the scale rod is adjustable of the axial position by releasing the fastening key, it is possible to perform accurate position of the scale rod relative to the cylindrical member, accurate axial adjustment can be performed by fitting the length of the scale rod to that required.

It should be noted that though the preferred embodiment set forth above has been constructed to provide the annular projections on the peripheries of one of the cylindrical member and the mounting block associated with the cylindrical member having no projection, it would be possible to have projections on both of the cylindrical members or both of the mounting blocks. In either case, essentially the same effect can be obtained as that disclosed above.

Furthermore, the configuration of the mounting blocks and the grooves can be modified in various ways. FIGS. 8 to 11 show examples of the modifications of the preferred embodiment of the mounting structure for the magnetic scale assembly.

Figure 8:
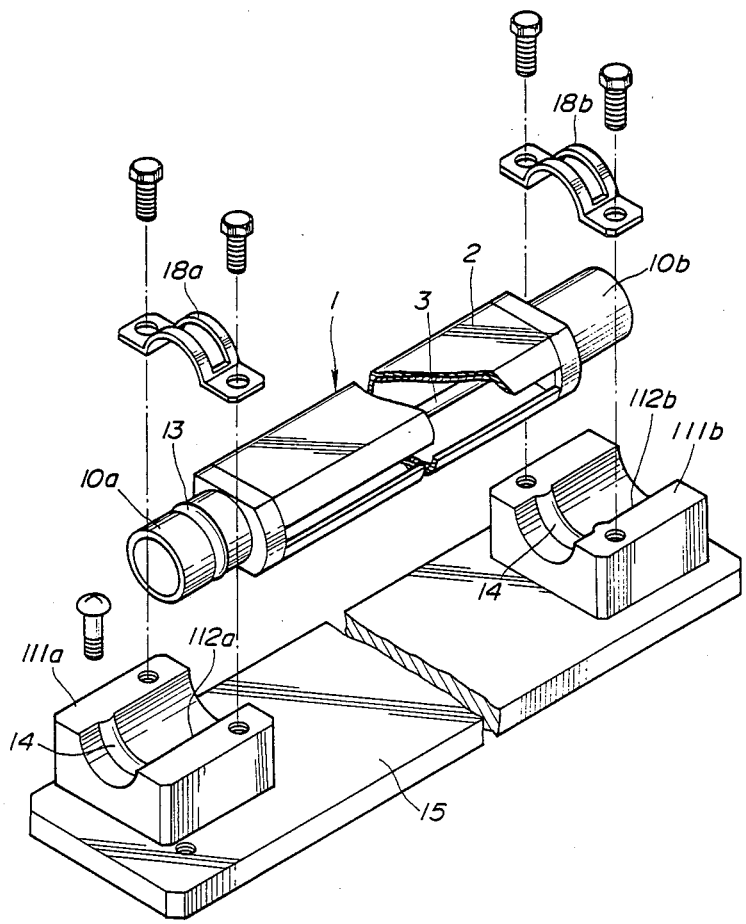
FIG. 8 shows an exploded perspective view of a modification of the preferred embodiment of the magnetic linear scale according to the invention.

The modification of FIG. 8 intends for the mounting blocks 111a and 111b to be used in common. In order to enable this, the mounting blocks 111a and 111b are formed with the grooves 112a and 112b throughout the overall axial length. The projections 14 are formed adjacent one axial end of each groove. Therefore, each smooth inner periphery is provided in the groove adjacent the other end.

In this construction, the cylindrical member 10a with the projection 13 is mounted at the portion of the groove adjacent the aforementioned the other end. On the other hand, the cylindrical member 10b is mounted in the groove 112b in contact with the projection 14.

By this modification, the single construction of the mounting blocks can be commonly used as the mounting blocks for receiving the different constructions of the cylindrical members.

FIGS. 9 and 10 show variations of the configuration of the grooves to be formed in the mounting block. Since the line contact or point contact between the cylindrical member and the mounting block assures capability of pivotal adjustment of the scale rod position. Therefore, the modifications of FIGS. 9 and 10 respectively provide sectionally V-shaped and quadrangular grooves 212a and 312a . Furthermore, the grooves defined in the shown embodiments may be replaced with a gap 412a defined between a pair of projections 411a and 411b, as shown in FIG. 11.

Figure 12:
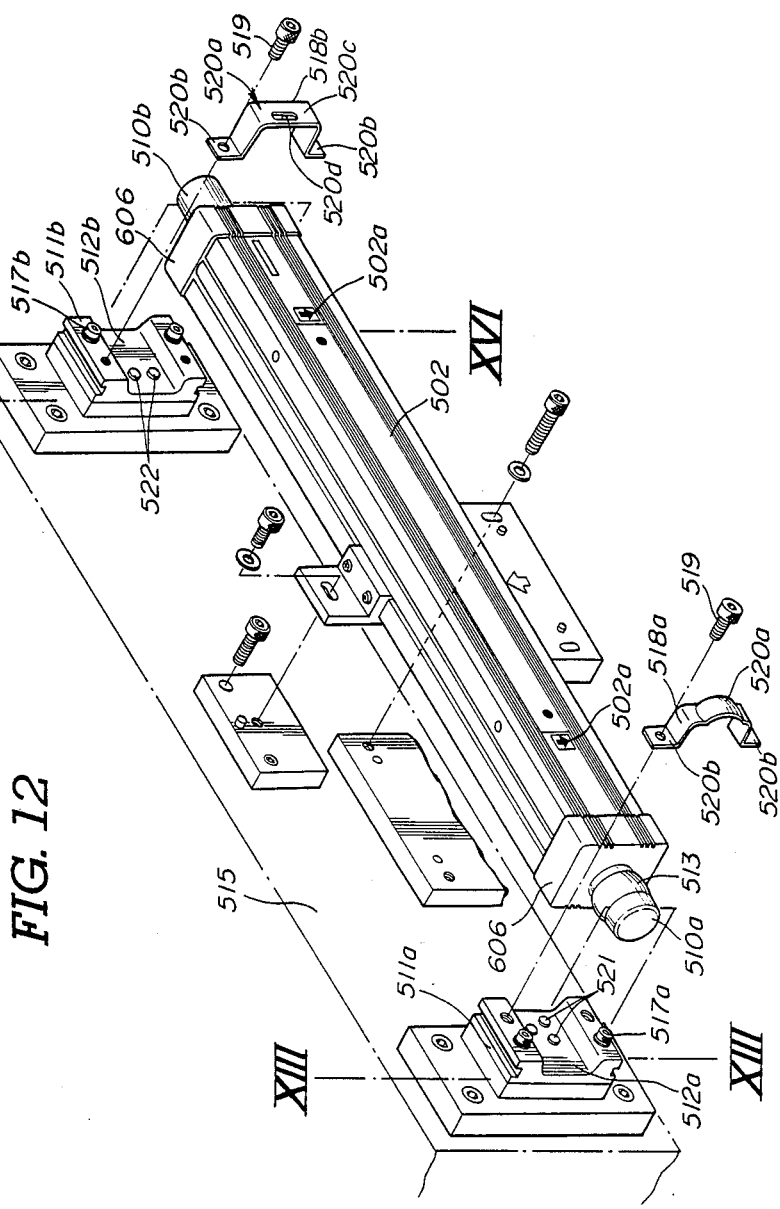
FIG. 12 is an exploded perspective view of another embodiment of a magnetic linear scale unit according to the invention.
Figure 13:
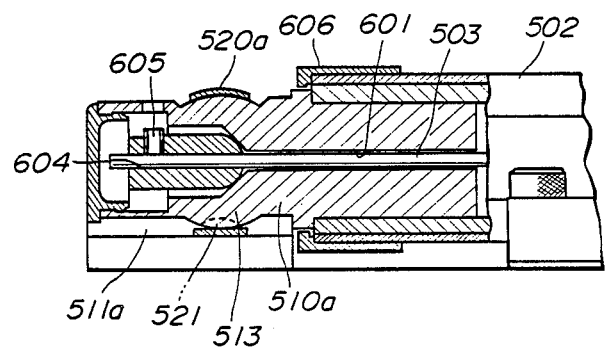
FIG. 13 is an enlarged section of the linear scale unit in assembled form, taken along line XIII—XIII of FIG. 12.
Figure 14:
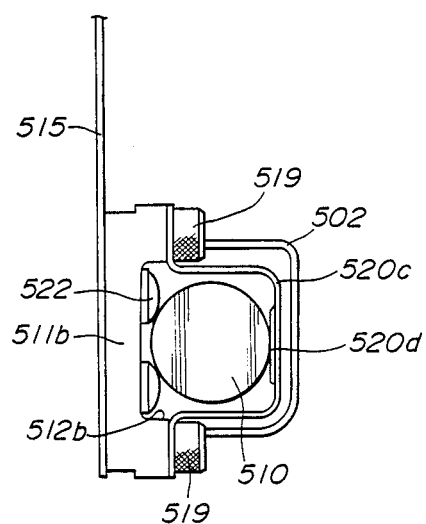
FIG. 14 is an enlarged section of the linear scale unit in assembled form, taken along line XVI—XVI of FIG. 12.

FIGS. 12 to 14 show another embodiment of a mounting structure for a magnetic linear scale, implementing the present invention. This embodiment is illustrated in a form that the scale rod 503 is mounted on a vertical plane 515. Similarly to the former embodiment, the scale rod 503 is connected to cylindrical members 510a and 510b at both ends thereof. A scale channel 502 is secured between the cylindrical members via flange members 606. Alignment marks 502a are provided on the surface of the scale channel 502. The cylindrical member 510a has an intermediate radially bulged portion 513. The bulged portion 513 extends circumferentially in entire circumference of the cylindrical member. The bulged portion 513 has essentially hemisphere profile. On the other hand, the cylindrical member 510b has plane circumferential surface. These cylindrical members 510a and 510b are mounted on the vertical plane 515 by means of mounting blocks 511a and 511b which are secured onto the plane by means of fastener bolts 517a and 517b.

As seen from FIGS. 12 and 13, the mounting block 511a is formed with a longitudinally extending groove 512a which has an essentially flat bottom. Three round-top projections 521 project from the flat bottom of the groove 512a. The projections 521 are so arranged as to contact with the surface of the bulged portion 513 in a manner as illustrated in FIG. 13. The cylindrical member 513 is secured onto the mounting block 511a by means of a fastening clip 518a having flange sections 520b to be secured onto the mounting block 511a by means of fastening bolts 519 and semi-circular section 520a. The semi-circular section 520a is formed in conformance with the periphery of the hemisphere bulged portion 513.

On the other hand, the mounting block 511b has a longitudinally extending groove 512b with essentially flat bottom. A pair of projections 522 project from the bottom of the groove 512b. The projections 522 are arranged at essentially symmetrical positions with respect to the longitudinal axis and the magnetic scale assembly and at positions to contact with the peripheral surface of the cylindrical member 510b. This cylindrical member 510b is secured onto the mounting block 511b by means of a fastening clip 518b. Similarly to the clip 518a, the clip 518b has flange sections 520b to be secured onto the mounting block 511b. The major section 520a of the clip 518b is formed into essentially channel-shaped configuration to have a section 520c adapted to mate with the outer periphery of the cylindrical member 511b. An impression 520d is formed in the section 520c to project toward the periphery of the cylindrical member 510b. The impression 520d are thus contacts to the outer periphery of the cylindrical member 510b.

Therefore, three point-contacts are between the cylindrical members 510a and 510b and the assembly of the mounting block and the clip.

It should be appreciated the components in this embodiment of the mounting structure for the magnetic scale unit, which components are illustrated, will be represented by reference numerals 500 greater than that in FIGS. 1, 2 and 3. Such components should be appreciated as having essentially the same construction and to perform essentially the same function.

In the magnetic scale unit of FIGS. 12 to 14, the mounting blocks 511a and 511b are temporarily secured to the cylindrical members 510a and 510b. In this condition, the assembly is brought to the plane 515. At this position, parallelization to the motion axis along which relative displacement of the two components occurs, is performed utilizing the alignment mark 502a. During this parallelization, the position of the mounting blocks 511a and 511b are determined.

Thereafter, the mounting blocks 511a and 511b are mounted and secured on the plane 515 by means of the fastening bolts 517a and 517b. Then, the cylindrical members 510a and 510b are put into the grooves 512a and 512b with contacting the outer peripheries thereof onto the projections 513 and 514. In this condition, fine adjustment of the scale rod position can be performed by placing the axis of the scale rod in precisely parallel to the motion axis of the relative displacement to measure. Thereafter, the cylindrical members 510a and 510b are rigidly secured to the mounting blocks 511a and 511b by securing the fastening clips 512a and 512b on the mounting blocks.

During the fine adjustment, the three-point contacts between the bulged portion 513 and the projections 512 and between the plane periphery of the cylindrical member and the projections 522 and the impression 520d of the clip 518b may allow pivotal movement thereabout for precisely adjusting the scale rod position. In addition, three-points contact precisely specifies the position of the cylindrical members relative to the mounting block, re-installation of the scale rod after once released for maintenance or other reason, become easy and precise. In addition, similarly to the former embodiment, the dimensional accuracy of the scale channel does not affect precision of installation of the scale rod and parallelism of the latter relative to the motion axis of the relatively displaceable components. This does not require accuracy in production of the scale channel.

It should be appreciated that the cylindrical member 510a and 510b are not specified to the specific form as that illustrated and can be any appropriate configurations, such as ball-shaped. The essential feature of the invention is to establish three-point contacts between the cylindrical member with the mounting elements, i.e. mounting block and fastening clip.

Therefore, in the embodiment of FIGS. 12 to 14, substantially the same advantages can be obtained as that can be obtained in the former embodiments.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A mounting structure for a linear scale assembly comprising:
    a scale assembly including an elongated magnetic scale, and a shield member for establishing a shield around said magnetic scale;
    a first end member directly connected to and extending from the first end of said scale, said first end member having a generally cylindrical periphery at least in part;
    a second end member directly connected to and extending from the second end of said scale at an opposite end to said first end member, said second end member having a generally cylindrical periphery at least in part;
    a first mount secured to a mounting surface at an orientation corresponding to said first end member and defining a groove for receiving said first end member, an inner periphery of said groove being so designed as to mate with said cylindrical periphery of said first end member; and
    a second mount secured to a mounting surface at an orientation corresponding to said second end member and defining a groove for receiving said second end member, an inner periphery of said groove being so designed as to mate with said generally cylindrical periphery of said second end member; and
    a first projecting member having an annular configuration and formed with and projecting from said cylindrical periphery of said first end member and being interposed between mating peripheries of said first end member and said first mount for reducing contact area between said periphery of said first end member and said inner periphery of said groove for allowing pivotal movement of said scale assembly relative to said first mount; and,
    a second projecting member having an annular configuration and formed with and projecting from said second mount and being interposed between mating peripheries of said second end member and said second mount for reducing contact area between said periphery of said second end member and said inner periphery of said second mount groove for allowing pivotal movement of said scale assembly relative to said second mount.

2. A mounting structure as set forth in claim 1, wherein, each of said first and second mounts respectively comprises a stationary member to be fixed to said mounting surface and a fixture member secured to said stationary member for fixing associated ones of said first and second end members, said fixture member of said second mount incorporating said second projecting member for allowing movement of said second projecting member when said scales is pivotally moved.

3. The structure as set forth in claim 1, which further comprises a plurality of fasteners for releaseably holding respectively ones of said end members in respective ones of said grooves.

4. The structure as set forth in claim 3, wherein said first annular projecting member for reducing the contact area is so designed as to define a pivot for said scale assembly for pivotal movement about said first mount.

5. The structure as set forth in claim 4, wherein said first annular projecting member for reducing the contact area is so designed as to determine the axial position of said first end member relative to said first mount.

6. The structure as set forth in claim 5, wherein said first annular projecting member for reducing the contact area establishes a line-contact with a circumferentially extending line between said inner periphery of said groove of said first mount and the outer periphery of said first annular projecting member.

7. The structure as set forth in claim 5, wherein said first annular projecting member for reducing the contact area establishes a line-contact with a circumferentially extending line between the inner periphery of one of said fasteners and said cylindrical periphery of said first end member.

8. A mounting structure for a linear scale assembly comprising:
   a scale assembly including an elongated magnetic scale, and a shield member for establishing a shield around said magnetic scale;
   a first end member directly connected to an extending from the first end of said scale, said first end member having a generally cylindrical periphery at least in part;
   a second end member directly connected to and extending from the second end of said scale at an opposite end to said first end member, said second end member having a generally cylindrical periphery at least in part;
   a first mount secured to a mounting surface at an orientation corresponding to said first end member and defining a groove for receiving said first end member at a first portion; and
   a second mount secured to a mounting surface at an orientation corresponding to said second end member and defining a groove for receiving said second end member at a second portion;
   a first projecting member having an annular configuration and projecting from said cylindrical periphery of said first end member at a portion mating with said first portion of said first mount for reducing contact area between said periphery of said first end member and said groove of said mount for allowing pivotal movement of said scale assembly relatives to said first mount, and
   a plurality of rounded top projections formed with end extending from said groove of said second mount at said second portion for reducing contact area between said cylindrical periphery of said second end member and said groove of said second mount for allowing pivotal movement of said scale assembly relative to said second mount.

9. The structure as set forth in claim 8, which further comprises a plurality of fasteners for releaseably holding respective ones of said end members in respective ones of said grooves.

10. The structure as set forth in claim 8, wherein said rounded top projections establish point-contacts with a contact point between the inner periphery of said groove of said second mount and said cylindrical periphery of said second end member.

11. The structure as set forth in claim 10, wherein said rounded top projections for reducing the contact area establishes two contact points at positions laterally aligned and essentially symmetrical with respect to the center axis of said scale assembly.

12. The structure as set forth in claim 10, wherein said rounded top projections establish three contact points which are so arranged as to define the pivot position of said second end member.

13. The structure as set forth in claim 9, wherein said rounded top projections establish point-contacts with a contact point between as inner periphery of one of said fasteners and said cylindrical periphery of said end second member.

14. The structure as set forth in claim 13, wherein said rounded top projections for reducing the contact area establishes three contact points which are so arranged as to define the pivot position of said second end member.

15. The structure as set forth in claim 10, wherein said rounded top projections in said second groove define three projections arranged to establish three-point contact with said cylindrical periphery of said second end member for defining a pivoting point of said scale assembly essentially at the center of said three-points.

16. The structure as set forth in claim 9, wherein one of said fasteners has a projection extending from a surface mating said cylindrical periphery of said second end member, and said groove in said second mount is formed with a pair of said rounded top projections arranged in lateral alignment with each other and essentially symmetrical positions with respect to the center axis of said scale assembly, said projection of one of said fasteners being cooperative with said rounded top projections of said groove for establishing three-points contact with said second end member for defining the pivot for said scale assembly.

* * * * *